Figure 1:
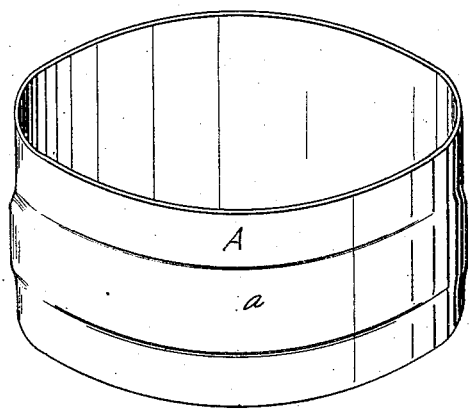

Dec. 6, 1932.  F. T. ROBERTS  1,889,904
METHOD OF MAKING INNER TUBES AND AIR BAGS
Filed Jan. 18, 1930   3 Sheets-Sheet 1

Inventor
Fred Thomas Roberts,
By Baker, Golrick & Fearn
Attorneys

Dec. 6, 1932.  F. T. ROBERTS  1,889,904
METHOD OF MAKING INNER TUBES AND AIR BAGS
Filed Jan. 18, 1930   3 Sheets-Sheet 3
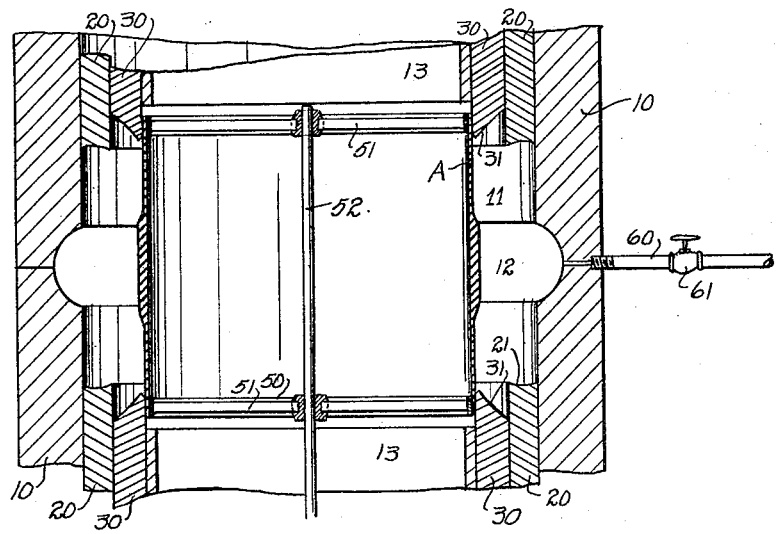
FIG.-5
FIG.-6
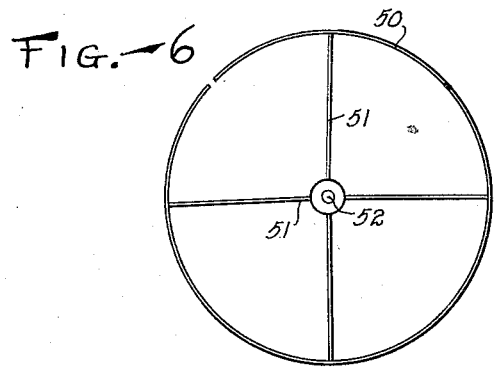
FIG.-7
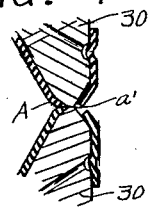
FIG.-8   FIG.-9   FIG.-10   FIG.-11
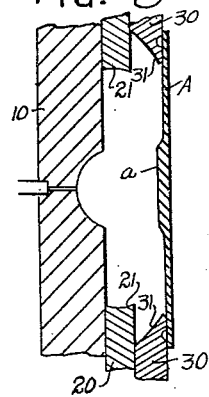
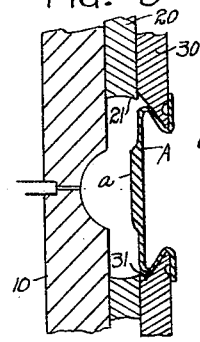
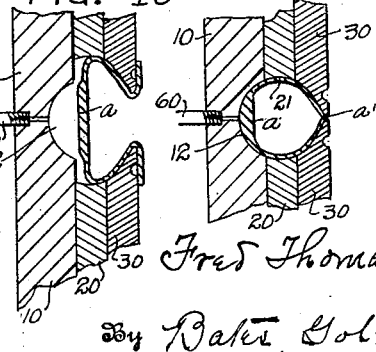
Inventor
Fred Thomas Roberts,
By Bates, Golrick & Teare
Attorneys Patented Dec. 6, 1932

1,889,904

UNITED STATES PATENT OFFICE

FRED THOMAS ROBERTS, OF MALONE, NEW YORK

METHOD OF MAKING INNER TUBES AND AIR BAGS

Application filed January 18, 1930. Serial No. 421,643.

This invention relates to a method of making a biscuit from a single sheet of plastic material by bending it so that two regions come together and are joined by pressure in a seam. For instance, the method may be employed in the manufacture of an inner tube for an automobile tire or an annular air bag, in which case the intermediate zone of an annular band of stock is forced into an annular mold cavity and the marginal portions of the band are brought together and joined by an annular seam.

An object of the invention is to provide for the rapid and economic manufacture of articles of plastic material from sheet stock by forming a junction with the minimum number of seams. I can, by this invention, for instance, manufacture an inner tube for automobile tires without a transverse splice and with only one peripheral seam.

In carrying out my method as applied to annular tubes, I first build up an annular band of suitable material, like a pulley band, and place this band across the mouth of an annular cavity located on the exterior of the band and so formed that its shape may be changed during operation. Then I exhaust air from the cavity and at the same time cause its side walls to approach so that the band is pneumatically forced into the cavity and the cavity is caused to assume a shape corresponding to that of the tube to be produced. As this change of shape is completing itself, the cavity walls at the inner side of the tube come together and press the folded stock to form a seam and shear off the surplus stock. Thus an annular biscuit is produced which is thereafter suitably vulcanized. A tire nipple may be inserted at the time it is being formed, or after formation of the biscuit, or after vulcanization.

My invention is illustrated in the drawings hereof, which show the parts of suitable apparatus for use in carrying out the process in the manufacture of annular tubes. It is hereinafter more fully explained in connection with the description of such apparatus, and its essential novel features are summarized in the claims.

Figure 3:
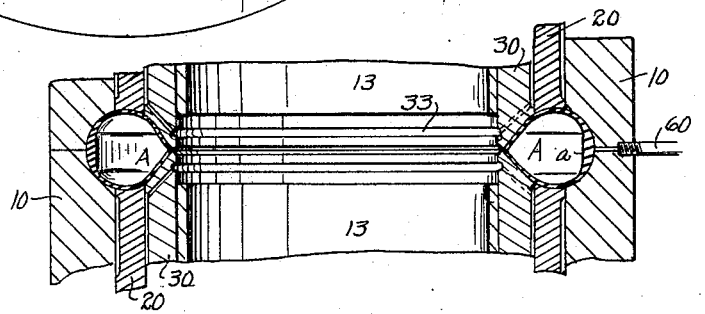
Figure 4:
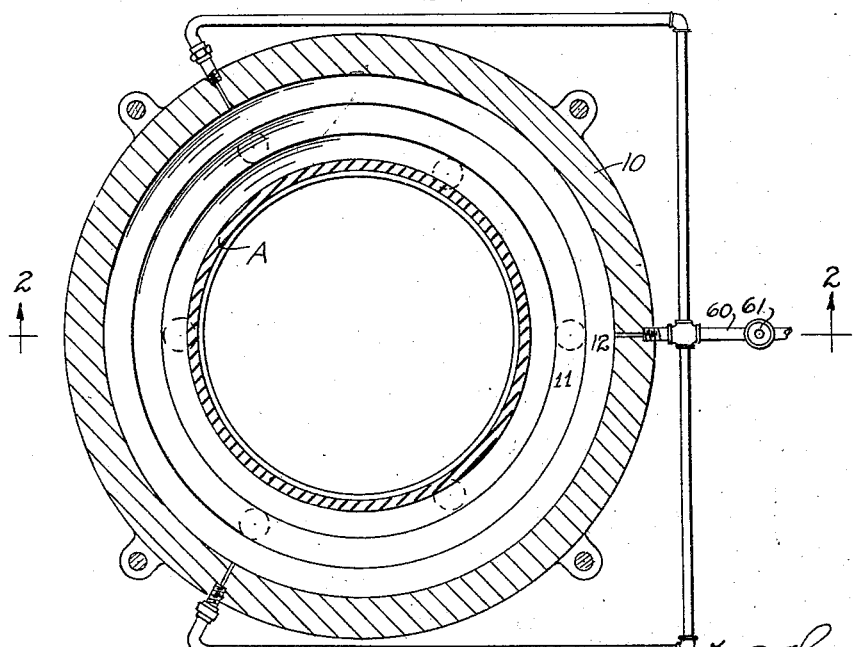
Figure 2:
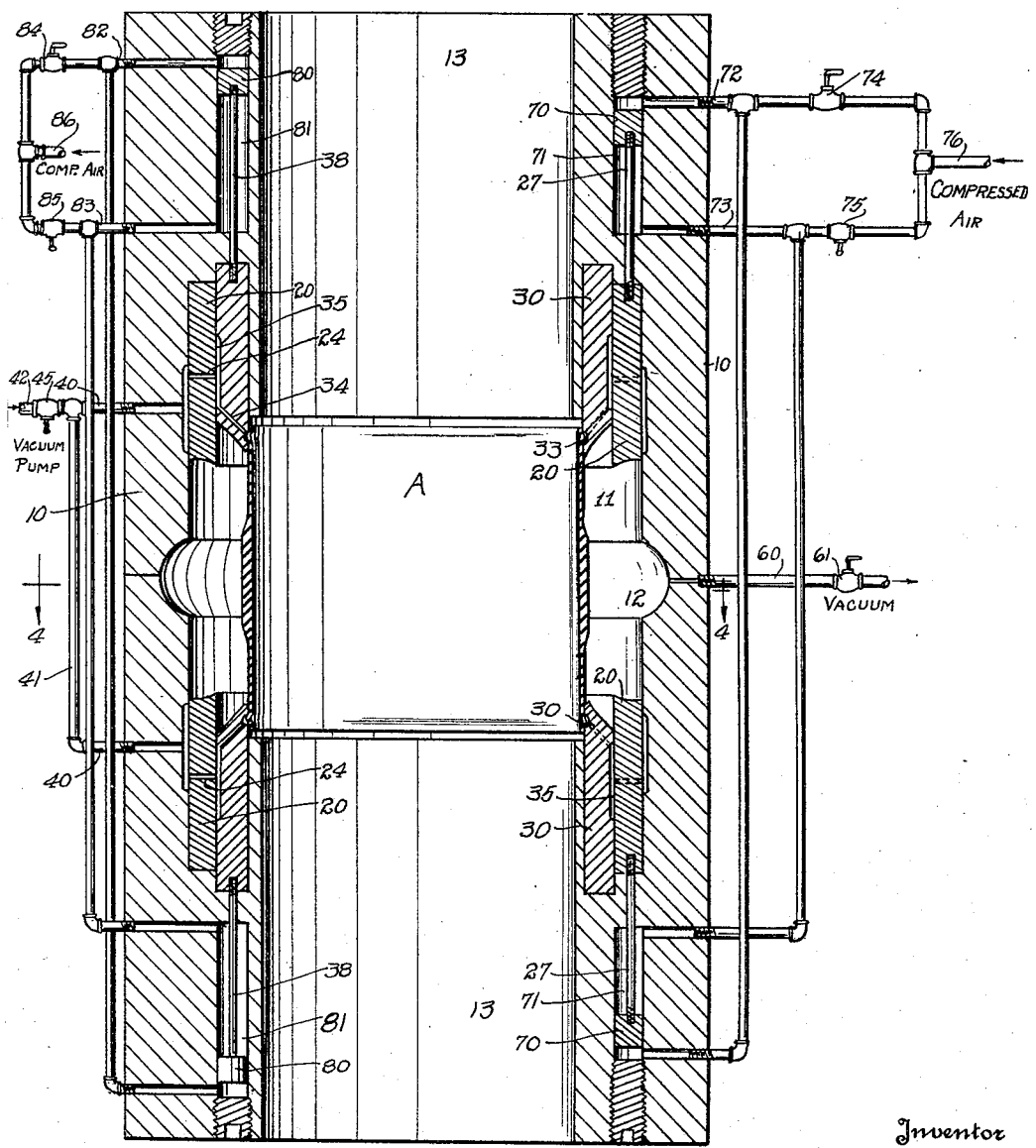

In the drawings Fig. 1 is a perspective of the annular band of material to be made into a tube; Fig. 2 is a longitudinal vertical section of an apparatus for use in converting the band into an annular biscuit; Fig. 3 is a fragmentary view of a portion of the apparatus shown in Fig. 2, showing the parts at the conclusion of the operation; Fig. 4 is a central cross section through the forming mould as indicated by the lines 4—4 on Fig. 2; Fig. 5 is a fragmentary vertical section of the forming apparatus, showing a modified method of clamping the stock in place; Fig. 6 is a plan of the clamp shown in Fig. 5; Fig. 7 is an enlarged view of the edges of the forming mould at the completion of the operation. The remaining figures are diagrams illustrating various stages of the operation of forming, Fig. 8 showing the mould and rubber band at the beginning of the operation; Fig. 9 after the seating operation has started and the mould members have moved toward each other; Fig. 10 after the seating has further progressed and the mould members are nearer together, and Fig. 11 at the conclusion of the forming operation.

As shown in Figs. 2 to 5 inclusive, 10 indicates a suitable vertical hollow shell which has in it a suitable annular mould cavity 11, this cavity being for the most part cylindrical but having its mid-region deepened on the outer side by an annular trough-like portion 12. Slidably mounted in the member 10, in line with the cavity 11, are pairs of sleeves, two pairs being shown, designated respectively 20 and 30. The extreme inner ends 21 and 31 respectively of these sleeves are so formed that when the sleeves are in their innermost position, the faces cooperate with the trough-like depression 12 to form a mould cavity corresponding to the shape of an inner tube, as illustrated in Fig. 11. When the sleeves 20 and 30 are as far apart as possible, as shown in Figs. 2 and 8, they leave the substantially cylindrical cavity 11 referred to, the longitudinal dimension of which is slightly less than the width of the band of rubber, this band being indicated at A.

Suitable means are provided for clamping the band A to the plunger sleeve 30, for moving the sleeves 20 and 30 toward each other to change the shape of the cavity, and for exhausting air from the cavity, whereby the biscuit is formed.

The annular band A is made up of raw rubber or other material, laminated, reinforced or thickened in the intermediate zone if desired, a suitable thickening for the tread portion being indicated at $a$ in the drawings. This band is placed within the central bore 13 of the apparatus and the edge portions are clamped against the sleeves 30, then the sleeves 30 are caused to approach each other. The sleeves 20 are also caused to approach, preferably at different times or a different speed from the sleeves 30, and air is exhausted from the cavity. As the operation starts, the band sinks into the cavity and hugs the edges of the sleeves 30, as illustrated in Fig. 9. Then as the sleeves come nearer together, the band sinks further into the cavity, bearing also against the sleeves 20, and finally the band sinks into the depression 12 of the cavity. In the final position of the parts, the end walls 21 of the sleeves 20 merge with the trough-like surface 12 of the cavity and also with the surface 31 of the sleeves 30. In this final operation the extreme edges of the sleeves 30 come together as shown in Fig. 7. These edges are suitably beveled so that they pinch together the two walls of the biscuit to form a seam $a'$, at the same time shearing off the surplus stock. Thereafter, when the moulds are separated, the closed annular biscuit is removed and placed in a proper mould for vulcanization.

If desired, an inflating nipple for the tube might be so carried as to be clamped in place across the seam $a'$ at the time of the formation of the biscuit, but I regard it as simpler either to make a hole in the formed biscuit at the seam after its formation and seal the nipple in place at the time of vulcanization, or to wait until after vulcanization and then puncture the tube and insert the nipple and cement and clamp it in place in the usual manner.

Any suitable means may be employed for clamping the band to the sleeve 30 and for operating the sleeves. In Fig. 2 I have illustrated the band clamped by suction, that is to say, I provide an annular groove 33 in the exposed cylindrical surface of each sleeve 30 and I provide means for exhausting these grooves of air. I have shown a passageway 34 leading to a wide groove 35 on the opposite side of the sleeve 30. This groove allows communication with a passageway 24 through the sleeve 20 which is in constant communication with a wide groove 15 in the wall 10. Suitable piping leads from this groove 15 to an exhaust pump, this piping being indicated at 40, 41 and 42 under the control of a valve or cock 45.

In Figs. 5 and 6, I have illustrated another form of apparatus for initially clamping the edges of the band to the mould rings. This consists of spring bands 50, split apart at their ends, and carried by spring spokes 51 which may be mounted on a suitable rod 52. These bands are collapsed sufficiently to be placed within the band of rubber A and when released spread sufficiently to press the rubber against the adjacent wall of the mould sleeves 30 to hold the stock thereto in an air-tight manner.

After the rubber band A is clamped against the mould sleeves 30 in any suitable manner, the air is exhausted from the cavity 11 outside of the band. This exhaustion may be readily made effective by means of piping 60 leading from the cavity portions 12 to a suitable exhaust pump under the control of a valve or cock 61.

I have illustrated means for operating the mould sleeves 20 and 30, which may for instance be actuated by compressed air or hydraulically. Thus, the sleeve 20 is shown as connected by longitudinal rods 27 to an annular plunger 70 mounted in a cylinder 71 in or carried by the main frame 10. Pipes 72 and 73 lead from opposite ends of this cylinder, under control of suitable venting valves 74 and 75, to a pressure pipe 76 leading to the source of supply. In a similar manner the rings 30 are connected by rods 38 to annular plungers 80 mounted in cylinders 81 connected by piping 82 and 83 with a supply pipe 86 under the control of venting valves 84 and 85.

The sleeves of each pair are controlled in unison to approach or recede simultaneously, and so that the valves 74 and 84 effect the approach of all four rings shown while the valves 75 and 85 control their recession. It is to be understood that whenever any valve, as 74, 84 for instance, is closed against the admission of compressed air to one end of the cylinder, it automatically vents that end so that the other valve as 75, 85 is free to operate.

I have described the apparatus with two pairs of sleeves 20 and 30 forming the movable part of the mould. However, if desired, this number may be varied; thus, for some purposes one movable sleeve might be sufficient, and for others more than two might be desired.

I claim:

1. The method of manufacturing articles of plastic material comprising placing a sheet of stock over a cavity and pneumatically forcing a region of such stock into the cavity while causing the cavity to change its shape until opposed regions of the stock are thereby brought into contact with each other under pressure sufficient to form a seam.

2. The method of forming articles comprising placing a sheet of plastic stock over a cavity, forcing such stock into the cavity while causing the opposite walls of the cavity to approach each other until a seam is formed between different regions of the stock.

3. The method of making hollow articles comprising placing a sheet of plastic material across the mouth of a mould cavity, clamping the marginal edge of the sheet, causing the cavity to shrink in cubical content while forcing the intermediate regions of the stock into the cavity, and joining together opposed regions of the material to make a closed article.

4. The method of making hollow rubber articles comprising placing a rubber blank across the mouth of a mould cavity, clamping the marginal edge of the blank, causing the opposite walls of the cavity to approach each other while pneumatically forcing the intermediate region of the blank into the cavity, and continuing the movement of the walls adjacent the entrance of the cavity until opposed regions of the blank are brought into contact and joined at such entrance.

5. The method of making closed hollow articles comprising placing stock across the mouth of a cavity, forcing an intermediate zone of the stock into the cavity, while causing the cavity to change its shape until the edges of the cavity are brought nearer together than the combined thickness of the marginal portions of the stock and thereby press the marginal portions of the stock together to form a seam.

6. The method of making hollow rubber articles comprising placing the material across the mouth of a mould cavity, pneumatically forcing the material into the cavity and at the same time causing the side walls of the cavity to approach each other and finally to pinch together the marginal portions of the blanks.

7. The method of manufacturing annular tubes comprising placing an annular band over an annular cavity, and forcing a zone of the band into the cavity while causing the cavity to change its shape until opposed regions of the band are thereby brought together and pressed upon each other sufficiently to form an annular seam.

8. The method of making annular tubes comprising placing an annular band across the mouth of a cavity, pneumatically forcing the band into the cavity, while causing the cavity to change its shape until the edges of the cavity are brought together to press the marginal portions of the band together with sufficient pressure to form a seam.

9. The method of making annular tubes, comprising placing an annular band across the mouth of an annular mould cavity, pneumatically forcing the intermediate region of the band into the cavity while retaining the band at its margin, and at the same time causing the walls of the cavity to approach each other and finally substantially come together at one edge whereby the formed band is pinched together to form a peripheral seam.

10. The method of making annular tubes comprising placing an annular band across mouth of a mould cavity, exhausting the cavity to cause the band to sink into it, and causing the side walls of the cavity to approach each other during such exhaustion sufficiently to press two regions of the band together in a seam and cut off the surplus stock.

11. The method of making annular tubes, comprising placing an annular band across the mouth of an annular mould cavity which stands outside of the band, forcing the intermediate region of the band into the cavity while retaining the band at its margin, and at the same time causing the walls of the cavity to approach each other and finally substantially come together at the inner edge whereby the formed band is pinched together along the inner periphery of the tube and the surplus stock sheared off.

12. The process of making hollow rubber articles comprising placing the rubber stock across the mouth of a movable mould cavity, clamping the marginal portion of the stock, forcing the intermediate region of the stock into the cavity while bringing the side walls of the cavity toward each other and the clamped margins of the stock toward each other to form the article, such side walls adjacent the entrance of the cavity eventually coming substantially together to form a seam of the stock on itself adjacent the margins.

13. The method of making hollow rubber articles comprising placing the plastic stock across the mouth of a changeable mould, forcing the material into the mould cavity while causing the side walls of the cavity to approach each other, the edges of said side walls adjacent the margins of the stock eventually coming substantially together to form a seam in the stock and shear off the surplus material.

14. The method of making hollow annular tubes comprising placing a substantially cylindrical band across the mouth of a changeable mould cavity surrounding the band, clamping the margins of such band against the exterior of the mould, causing the mould walls to approach each other and at the same time exhausting air from the cavity whereby the stock is seated in the cavity and the cavity caused to change its shape to that of the exterior of the tube to be formed, the inner edges of the cavity eventually coming together to form an inner peripheral seam on the tube and shear off the surplus stock.

15. The method of making annular tubes comprising placing an annular band across the mouth of a cavity, clamping the marginal portions of said band, gradually creating a vacuum within said cavity at the same time causing the walls of said cavity to approach each other, the mouth of said cavity being large enough so that the material of said annular band first entering the cavity due to the difference in pressure will be sufficient to completely line said cavity when the walls come to their final position, whereby substantially no stretching of the annular band will take place, the edges of said wall adjacent the margin of said annular band eventually coming together to form a seam in the band and shear off the surplus material.

In testimony whereof, I hereunto affix my signature.

FRED THOMAS ROBERTS.